United States Patent

[11] 3,614,658

[72] Inventor John P. Goldsborough
San Jose, Calif.
[21] Appl. No. 792,952
[22] Filed Jan. 22, 1969
[45] Patented Oct. 19, 1971
[73] Assignee Spectra-Physics, Inc.
Mountain View, Calif.

[54] GAS LASER HAVING MEANS FOR MAINTAINING A UNIFORM GAS MIXTURE IN A DC DISCHARGE
12 Claims, 3 Drawing Figs.

[52] U.S. Cl. .................................................. 331/94.5,
315/108, 324/33
[51] Int. Cl. .................................................. H01s 3/22,
H01s 3/05, H01s 3/02
[50] Field of Search ............................................. 331/94.5;
315/108; 324/33

[56] References Cited
UNITED STATES PATENTS
3,493,892 2/1970 Whitteman et al. ......... 331/94.5
3,464,025 8/1969 Bell ............................ 331/94.5

OTHER REFERENCES

Howard, Jr., " Resonant Energy Transfer from Mercury to Zinc in Relation to a Gas Laser," U.S. Govt. Res. Reprt., AD 603680, August 1964, pp. 22-41

Bell (APL), "Visible Laser Transitions in Hg+ II, Applied Physics Letters," 4,(2), 15 Jan. 1964, pp. 34-35

Silfvast et al., " Laser Action in Singly Ionized Ge, Sn, Pb, In, Cd and Zn," Appl. Phys. Lett., 8, (12), 15 June 1966, pp. 318-319

Silfvast, " Efficient CW Laser Oscillation at 4416A in Cd (II)," Appl. Phys. Lett., 13, (5), 1 Sept. 1968, pp. 169-171

Goldsborough, " Continuous Laser Oscillation at 3250A in Cadmium Ion," IEEE Journ. Quant. Electronics, QE-5, Feb. 1969, pg. 133

Primary Examiner—Ronald L. Wibert
Assistant Examiner—R. J. Webster
Attorney—Jerald E. Rosenblum ABSTRACT: A DC discharge gas laser in which the active medium is a mixture of gases having a low ionization potential component. This component is supplied to the plasma tube at a position adjacent the anode and flows by DC cataphoresis in the direction of the cathode where it is removed from the system, thereby providing a substantial length of uniform ratio gas mixture which is particularly significant in small diameter plasma tubes. In the detailed examples, the laser is a helium-cadmium laser with continuous-wave operation at 4,416 A and 3,250 A, the flowing component of the active medium being cadmium vapor. Means are provided in modified embodiments to stabilize the concentration of the flowing component.

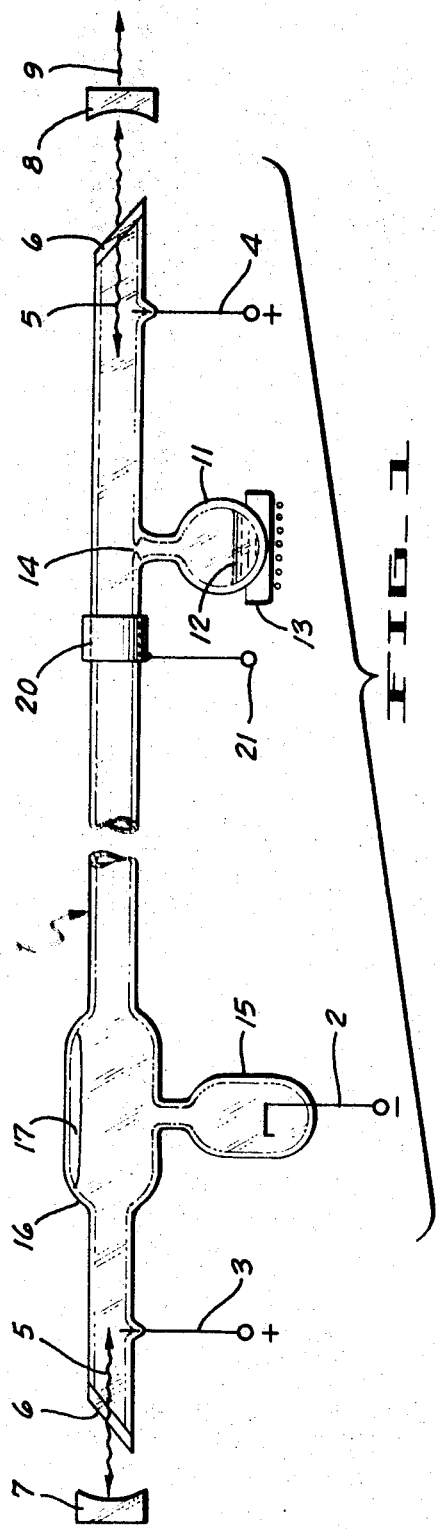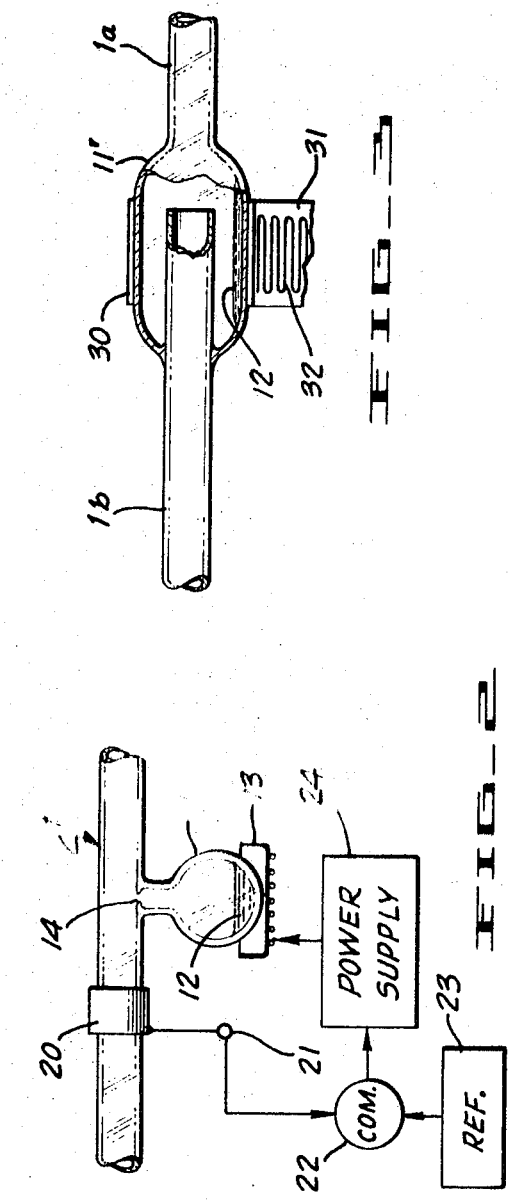
John P. Goldsborough
INVENTOR.

3,614,658

GAS LASER HAVING MEANS FOR MAINTAINING A UNIFORM GAS MIXTURE IN A DC DISCHARGE

BACKGROUND OF THE INVENTION

Many gas lasers use gas mixtures of two or more components as the active laser medium. When such a mixture is excited by a DC discharge, the component having the lowest ionization potential acquires a higher concentration of positive ions than the other components, resulting in the phenomenon of cataphoresis whereby the low ionization potential component flows towards the cathode. Countering this flow is the back difusion of the neutral atoms of said component away from the cathode. Since the gain of a gas laser usually varies inversely with the diameter of the plasma tube containing the gas mixture, it is desirable to minimize this diameter. Reducing the plasma tube diameter also results, however, in reducing the back difusion to the extent that the cataphoresis results in a large concentration gradient whereby only a very small length of the discharge has the proper mixture for laser action. The use of AC excitation is also generally unsatisfactory in a narrow diameter plasma tube because the time required to establish mixture uniformity is excessively long and the possibility of undesired output modulation exists.

SUMMARY OF THE INVENTION

According to the present invention, a gas laser using a mixture of gases is provided in which an equilibrium concentration of the low ionization component is maintained in a DC discharge over a substantial length of the plasma tube by feeding in a supply of said component adjacent an anode of the tube and causing it to flow towards a cathode of the tube where it is removed.

DESCRIPTION OF THE DRAWING

The various features and advantages of the present invention will become more apparent upon a consideration of the following specification taken in connection with the accompanying drawing, wherein:

FIG. 1 is a partially schematic and partially broken-away elevational view of a gas laser embodying the present invention;

FIG. 2 is a fragmentary view of a modification to the gas laser of FIG. 1; and

FIG. 3 is a fragmentary view of another modification to the gas laser of FIG. 2.

DESCRIPTION OF PREFERRED EMBODIMENTS

FIG. 1 discloses an example of the present invention in which the active gaseous medium is a mixture of cadmium vapor and helium. Under suitable discharge conditions, helium metastables collide with neutral cadmium atoms to form an inverted population of cadmium ions in an excited electronic state. The active medium thereby provides stimulated emission gain for optical radiation emitted by the cadmium ions.

In this embodiment, a generally cylindrical discharge or plasma tube 1, of dielectric material such as glass or ceramic, forms an envelope containing the active gaseous laser medium. A gas discharge is excited in the active medium by a DC power supply (not shown) connected between cathode 2 and anodes 3 and 4 to thereby emit optical radiation 5. The optical radiation 5 is retroreflected, through the laser medium of the tube 1 and through vacuum-tight transmission windows 6 (inclined at Brewster's angle for maximum transmission) sealed to each end of the tube 1, by an optical resonator comprising optically facing reflectors 7 and 8. The reflectors 7 and 8 are dielectrically coated for maximum reflectivity at the desired wavelength of laser operation, and the reflector 8 is made partially transparent in order to form an output beam 9.

Typically the plasma tube 1 is 3.0 mm. in diameter by 180 cm. in length, is filled with helium at a pressure of approximately 3.6 torr, and is operated at a discharge current of approximately 140 ma. DC.

An effuser appendage 11 is joined to the side of the plasma tube 1 a few centimeters inward from the anode 4. A supply 12 of cadmium metal is placed in the appendage 11 and is heated by a heater 13 to evolve cadmium vapor which is effused through an opening 14 into the main portion of the plasma tube 1. The cadmium thereupon becomes ionized by the discharge and travels by cataphoresis in the direction of the cathode appendage 15, the plasma tube 1 is enlarged to provide a coaxial tube region 16 whose walls are cool in comparison to the walls of the remaining portion of the plasma tube 1. The cadmium condenses as a film 17 on the cool walls of the enlarged tube section 16 and is thereby effectively removed from the system. In this configuration the immediate area of the cathode contains only helium (or other carrier gas) and hence any deleterious effects of the cadmium (or other transported substance) are avoided.

It should further be noted that the effuser 11 is sufficiently spaced from the anode 4 that a cataphoresis buffer of pure helium is established therebetween. This buffer region prevents cadmium and other impurities from reaching the window 6 and also insures that essentially all of the cadmium flows towards the cathode . A similarly functioning helium buffer is provided at the other end of the tube by the anode 3. It has been found that with sufficient condensation of cadmium on the walls of enlarged tube section 16, the anode 3 is not required.

For small diameter plasma tubes, the cataphoresis velocity is high and equilibrium at the desired mixture ratio of component gases (in this example, helium and cadmium vapor) is rapidly established. The rate of feed of the effuser 11 depends on the temperature of the heater 13 and the size of the entrance hole 14. For a 2 mm. diameter hole, a temperature of about 250° C. gives an injection rate which yields an optimum concentration of cadmium for laser action. The equilibrium cadmium vapor pressure is about 5 millitorr at this temperature. At this injection rate, a supply of a few grams of cadmium can sustain laser operation for several thousand hours. The plasma tube 1 (outside of the enlarged region 16) is a capillary cooled by convection only and operates at a wall temperature of about 350° C., which is sufficiently high that the cadmium does not condense in the capillary.

In previous cadmium ion lasers, a continuous-wave output of several milliwatts was obtained at 4,416 A for short periods of time using isotopically enriched cadmium. However the above-described cataphoresis effect prevented maintenance of an optimum gas mixture over any substantial period of operation. Moreover an ultraviolet output at 3,250 A, although predicted, had not been achieved in practice. Using the apparatus as described herein, I have been able to obtain a 100-mw. continuous-wave output at 4,416 A and a 5-mw. continuous-wave output at 3,250 A with cadmium of natural isotopic abundance. The 3,250 A output is the shortest wavelength continuous-wave laser output ever observed, and constitutes a convenient source of continuous-wave ultraviolet laser radiation.

The gas mixture ratio may be varied as desired by changing the injection rate at which the effuser 11 feeds the flowing component (cadmium in the above example). Moreover, as the mixture ratio is thereby changed, the voltage across the plasma tube 1 varies inversely with the concentration of the flowing low ionization potential component. For example, with the above-described plasma tube, the tube voltage drops from 4.0 kv. with a pure helium filling to about 3.0 kv. with the addition of cadmium vapor at the pressure-yielding maximum laser output, and to as low as 2.0 kv. with the addition of excessive cadmium vapor. This effect can be used to monitor and/or control the gas mixture ratio. It is not necessary to measure the total tube voltage; a probe or band working into a sufficiently high input impedance can be used to measure a fraction of this total tube voltage. For this purpose a metallic band 20 is placed inwardly adjacent the effuser 11 in FIG. 1 to provide a voltage signal at terminal 21 connected thereto which is responsive to changes in the injection rate of the effuser.

FIG. 2 discloses a modification in which the signal from terminal 21 is used to provide an automatic control of the injection rate of effuser 11, and hence the gas mixture in the plasma tube 1. The signal of terminal 21 is compared in a comparator 22 with a signal from a reference source 23 corresponding to the desired effuser injection rate. The output of the comparator 22 controls the power supply 24 of the heater 13. If the effuser deviates from the reference injection rate, the voltage of the terminal 21 changes thereby changing the output of the comparator 22 and hence the power supplied to the heater 13. The resulting change in the temperature of the effuser 11 will be in the proper direction to restore the injection rate to its reference value. Locating the band 20 closely inwardly adjacent the effuser 11 advantageously minimizes the time lag between a change in effuser injection rate and the corresponding change in the sensed tube voltage.

A modified construction for the effuser source is shown in FIG. 3. This effuser 11' is formed as a coaxial enlargement at the end of a portion 1a of the capillary. An aligned adjacent portion 1b is reentrantly supported in the coaxial effuser 11' in order to facilitate the maintenance of the discharge within the effuser 11'. The discharge in the effuser 11' heats the cadmium supply 12 contained therein. Since the discharge power is inversely related to the cadmium vapor pressure, this system tends to be self-regulating. To establish an operating temperature point, a heat sink is provided through a metallic strap 30 surrounding the effuser 11'. The heat sink may be adjusted by suitable contact between the strap 30 and other heat-conducting structures (not shown). To provide a fine control on the cadmium temperature, a metallic strap portion 31 is connected to the encircling strap 30, and a heater coil 32 is attached to the strap 31.

I claim:

1. A gas laser, comprising: a gas envelope; an active gaseous medium disposed within said envelope, said medium comprising a mixture of gases including a component having a lower ionization potential than the ionization potential of at least one other component in said mixture; at least one cathode and at least one anode disposed within said envelope; means applying a DC voltage between said cathode and said anode continuously in use for creating a discharge in said active gaseous medium which provides stimulated emission gain for continuous-wave generation of laser radiation; means adjacent said anode for supplying said low ionization potential component of said gas mixture which flows by DC cataphoresis in the direction of said cathode continuously during the continuous-wave generation of said laser radiation, said flow providing a substantial length of substantially uniform ratio of said mixture of gases; and means adjacent said cathode for continuously removing said component from said gas mixture and from the path of said laser radiation after it has flowed over said mixture length.

2. A gas laser according to claim 1 wherein said low ionization component is a metal vapor, and said supplying means comprises an appendage of said envelope containing a supply of the metal from which said vapor is evolved.

3. A gas laser according to claim 2 wherein said removing means comprises an appendage to said envelope having cool walls on which said metal vapor condenses.

4. A gas laser according to claim 2 including means positioned adjacent said appendage in the direction of said cathode for sensing a fraction of the voltage of said discharge.

5. A gas laser according to claim 4 including means for heating said metal supply, and means responsive to said voltage-sensing means for controlling said heating means to thereby stabilize the concentration of said metal vapor in said active medium.

6. A gas laser according to claim 3 wherein said envelope is generally cylindrical, said appendage comprises an enlarged coaxial section of said envelope, and cathode is disposed in an appendage to said enlarged coaxial section.

7. A gas laser according to claim 2 wherein said envelope is generally cylindrical, and said appendage comprises an enlarged coaxial section of said envelope.

8. A gas laser according to claim 7 wherein a reduced portion of said envelope reentrantly extends into said enlarged section in order to facilitate the maintenance of a discharge therein.

9. A gas laser according to claim 2 wherein said metal is cadmium.

10. A gas laser according to claim 9 including an optical resonator for obtaining a laser output at approximately 4,416 A.

11. A gas laser according to claim 9 including an optical resonator for obtaining a laser output approximately 3,250 A.

12. A gas laser according to claim 1 wherein the cross-sectional dimension of said plasma tube over at least a substantial portion of said mixture length is less than 5 mm.